US008271156B2

(12) United States Patent
Jinno et al.

(10) Patent No.: US 8,271,156 B2
(45) Date of Patent: Sep. 18, 2012

(54) HYBRID VEHICLE AND CONTROL METHOD THEREOF

(75) Inventors: Kunihiko Jinno, Toyota (JP); Tadashi Nakagawa, Nishikamo-gun (JP); Masahiko Maeda, Nagoya (JP); Hideaki Yaguchi, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 736 days.

(21) Appl. No.: 12/522,496

(22) PCT Filed: Dec. 14, 2007

(86) PCT No.: PCT/JP2007/074086
§ 371 (c)(1),
(2), (4) Date: Jul. 8, 2009

(87) PCT Pub. No.: WO2008/084626
PCT Pub. Date: Jul. 17, 2008

(65) Prior Publication Data
US 2009/0306843 A1    Dec. 10, 2009

(30) Foreign Application Priority Data
Jan. 12, 2007   (JP) .................................. 2007-004454

(51) Int. Cl.
*B60L 9/00* (2006.01)
(52) U.S. Cl. .................. 701/22; 180/65.28; 180/65.245; 180/65.225; 701/103; 123/179.3; 123/179.4
(58) Field of Classification Search .................... 701/22, 701/103; 180/422, 65.225, 65.245, 65.028; 123/179.3, 179.4
See application file for complete search history.

(56) References Cited

U.S. PATENT DOCUMENTS

| 6,213,233 | B1 | 4/2001 | Sonntag et al. |
| 6,228,305 | B1 | 5/2001 | Okuda et al. |
| 6,839,621 | B2 | 1/2005 | Kaneko |
| 6,899,162 | B2 | 5/2005 | Hohl et al. |
| 7,207,304 | B2 * | 4/2007 | Iwatsuki et al. ........... 123/179.3 |

(Continued)

FOREIGN PATENT DOCUMENTS

CN   1828023 A   9/2006

(Continued)

OTHER PUBLICATIONS

Industrial Applications of Fuzzy Logic at General Electric; Piero P. Bonissone, et al., Proceedings of the IEEE, vol. 83, Issue 3, Mar. 1995, pp. 450-465, Digital Object Identifier 10.1109/5.364490.

(Continued)

*Primary Examiner* — Behrang Badii
*Assistant Examiner* — Robert Payne
(74) *Attorney, Agent, or Firm* — Sughrue Mion, PLLC

(57) ABSTRACT

When determined that a driver's accelerator operation is rough during the turn-on condition of an ECO switch 88 while a hybrid vehicle 20 is driven without an operation of an engine 22 (Step S120), a threshold value Pref with respect to a power demand P* is set to a value P2 that is larger than a value P1 of the turn-off condition of the ECO switch 88 so as to give priority to fuel consumption of the engine 22 (Step S140). Then, the engine 22, motors MG1 and MG2 are controlled with a start of the engine 22 as necessary so as to ensure torque equivalent to a torque demand Tr* (Steps S150-S230).

10 Claims, 7 Drawing Sheets

U.S. PATENT DOCUMENTS

| | | | |
|---|---|---|---|
| 7,216,618 B2 * | 5/2007 | Iwatsuki et al. | 123/179.4 |
| 7,520,351 B2 * | 4/2009 | Uchisasai et al. | 180/65.245 |
| 7,527,111 B2 * | 5/2009 | Katsuhiro et al. | 180/65.225 |
| 7,925,417 B2 * | 4/2011 | Muta et al. | 701/103 |
| 2002/0104324 A1 | 8/2002 | Homan et al. | |
| 2005/0247495 A1 | 11/2005 | Tabata et al. | |
| 2006/0048982 A1 | 3/2006 | Yamamoto et al. | |
| 2006/0048988 A1 | 3/2006 | Dreibholz et al. | |
| 2006/0289214 A1 * | 12/2006 | Katsuhiro et al. | 180/65.4 |
| 2007/0265762 A1 | 11/2007 | Suzuki | |
| 2009/0125172 A1 | 5/2009 | Matsubara | |
| 2009/0152027 A1 * | 6/2009 | Kusaka et al. | 180/65.28 |
| 2009/0177345 A1 * | 7/2009 | Severinsky et al. | 701/22 |
| 2009/0299560 A1 * | 12/2009 | Tomatsuri et al. | 701/22 |

FOREIGN PATENT DOCUMENTS

| | | |
|---|---|---|
| CN | 100376764 C | 3/2008 |
| DE | 102005021582 A1 | 12/2005 |
| DE | 102004043589 A1 | 4/2006 |
| EP | 1632378 A2 | 3/2006 |
| GB | 2450957 A | 1/2009 |
| JP | 10-212983 A | 8/1998 |
| JP | 11-122713 A | 4/1999 |
| JP | 11-180137 A | 7/1999 |
| JP | 2000-161016 A | 6/2000 |
| JP | 2000-205000 A | 7/2000 |
| JP | 2001-224105 A | 8/2001 |
| JP | 2002-188480 A | 7/2002 |
| JP | 2002-213270 A | 7/2002 |
| JP | 2004-023959 A | 1/2004 |
| JP | 2004-044469 A | 2/2004 |
| JP | 2004-147379 A | 5/2004 |
| JP | 2004-222439 A | 8/2004 |
| JP | 2005-042561 A | 2/2005 |
| JP | 2005-319924 A | 11/2005 |
| JP | 2005-337173 A | 12/2005 |
| JP | 2006-074931 A | 3/2006 |
| JP | 2006-151039 A | 6/2006 |
| JP | 2006-152866 A | 6/2006 |
| JP | 2006-170128 A | 6/2006 |
| JP | 2006-321466 A | 11/2006 |
| JP | 2007-159214 A | 6/2007 |
| JP | 2008-114634 A | 5/2008 |
| JP | 2008-137518 A | 6/2008 |
| WO | 2009041138 A1 | 4/2009 |

OTHER PUBLICATIONS

Large-Scale Electrical Energy Storage; B.J. Davidson, et al., Physical Science, Measurement and Instrumentation, Management and Education, Reviews, IEE Proceedings A, vol. 127, issue 6, Jul. 1980, pp. 345-385.

Optimization of a Fuel-Cell EV Air-Conditioning System; C.P. Lawrence et al., Electrical and Computer Engineering, 2007. Canadian Conference on CCECE 2007, Apr. 22-26, 2007, pp. 1499-1502, Digital Object Identifier 10.1109/CCECE.2007.373.

* cited by examiner

HYBRID VEHICLE AND CONTROL METHOD THEREOF

TECHNICAL FIELD

The present invention relates to a hybrid vehicle and a control method thereof and more particularly to a hybrid vehicle including an internal combustion engine and a motor respectively capable of outputting power for driving the vehicle.

BACKGROUND ART

Conventionally, there is known a hybrid vehicle that includes an engine and a motor generator respectively capable of outputting power for driving the vehicle and is driven with power only from the motor generator while stopping an operation of the engine when a battery is a good state(for example, refer to Patent Document 1). In the hybrid vehicle, the engine is started when a required driving power exceeds a predetermined start power threshold during a driving without an engine operation, so that a driving state is shifted to a driving state with power from both the engine and the motor generator. Also, there is known a hybrid vehicle that presumes whether or not frequent acceleration and deceleration occur based on road maps and data stored in a navigation device and information from a beacon and a base station, and shifts an engine start threshold to a high speed side in accordance with a presumption result (for example, refer to Patent Document 2).

[Patent Document 1] Japanese Patent Laid-Open No. 2006-170128

[Patent Document 2] Japanese Patent Laid-Open No. 2000-205000

DISCLOSURE OF THE INVENTION

In such an above hybrid vehicle, the motor driving is performed until an engine start condition is satisfied once the engine is stopped, thereby improving fuel consumption. However, if the engine start condition (start power threshold) is defined as a constant condition, the engine is started in response to a satisfaction of the engine start condition even if the driving state actually permits the motor driving. Accordingly, there is room for an improvement in the fuel consumption of the above vehicle. Further, if presuming whether or not the frequent acceleration and deceleration occur and shifting the engine start threshold to the high speed side in accordance with the presumption result, the fuel consumption may be improved by reducing unnecessary engine starts. However, the frequent acceleration and deceleration occur irrespective of a driver's intention. Accordingly, it is difficult for drivers to intentionally continue the motor driving for the improvement in the fuel consumption.

The present invention has an object to allow drivers and the like to freely select whether or not to stop an internal combustion engine as long as possible for giving priority to fuel consumption in a hybrid vehicle including an internal combustion engine and a motor respectively capable of outputting power for driving the vehicle.

The present invention accomplishes the demand mentioned above by the following configurations applied to a hybrid vehicle and a control method thereof.

A hybrid vehicle according to the present invention is a hybrid vehicle including: an internal combustion engine capable of outputting power for driving the vehicle; a motor capable of outputting power for driving the vehicle; an accumulator capable of supplying electric power to the motor; a fuel consumption priority mode selection switch to select a fuel consumption priority mode that gives priority to fuel consumption; an engine start condition setting module configured to set a start condition of the internal combustion engine to a first condition when the fuel consumption priority mode selection switch is turned off during a driving without an operation of the internal combustion engine, the engine start condition setting module setting the start condition of the internal combustion engine to a second condition giving priority to fuel consumption in comparison with the first condition when the fuel consumption priority mode selection switch is turned on during the driving without the operation of the internal combustion engine; a driving force demand setting module configured to set a driving force demand required for driving the vehicle; and an engine stop driving control module configured to control the internal combustion engine and the motor so that a driving power equivalent to the set driving force demand is ensured without a start of the internal combustion engine when the set start condition is not satisfied during the driving without the operation of the internal combustion engine, the engine stop driving control module controlling the internal combustion engine and the motor so that the driving power equivalent to the set driving force demand is ensured with the start of the internal combustion engine when the set start condition is satisfied during the driving without the operation of the internal combustion engine.

In the hybrid vehicle, the start condition of the internal combustion engine is set to the first condition when the fuel consumption priority mode selection switch is turned off during the driving without the operation of the internal combustion engine. When the fuel consumption priority mode selection switch is turned on during the driving without the operation of the internal combustion engine, the start condition of the internal combustion engine is set to the second condition giving priority to fuel consumption in comparison with the first condition. Then, the internal combustion engine and the motor are controlled so that the driving power equivalent to the driving force demand required for driving the vehicle is ensured without the start of the internal combustion engine when the start condition is not satisfied during the driving without the operation of the internal combustion engine. When the set start condition is satisfied during the driving without the operation of the internal combustion engine, the internal combustion engine and the motor are controlled so that the driving power equivalent to the driving force demand is ensured with the start of the internal combustion engine. Thus, in the hybrid vehicle, it is possible to allow drivers and the like to freely select whether or not to stop the operation of the internal combustion engine as long as possible for giving priority to fuel consumption by only operating the fuel consumption priority mode selection switch. Further, the stop of the internal combustion engine may be maintained until the satisfaction of the second condition giving priority to fuel consumption in comparison with the first condition when the fuel consumption priority mode selection switch is turned on during the driving without the operation of the internal combustion engine, so that the fuel consumption may be improved by reducing unnecessary engine starts.

The second condition may have a tendency to permit the stop of the internal combustion engine to continue in comparison with the first condition. Thus, the fuel consumption may be improved when the fuel consumption priority mode selection switch is turned on.

The first and second conditions may be respectively satisfied when the set driving force demand is equal to or more than a predetermined threshold, and the threshold in the second condition may be larger than that in the first condition. Thus, while the start condition of the internal combustion engine is set to the first condition due to the turn-off of the fuel consumption priority mode selection switch during the driving without the operation of the internal combustion engine, the internal combustion engine is started when the driving force demand becomes large to some extent. Accordingly, though the improvement of the fuel consumption may be slightly deteriorated, it is possible to quickly respond to an increase demand of the driving force so as to ensure drivability such as acceleration performance. Further, while the start condition of the internal combustion engine is set to the second condition due to the turn-on of the fuel consumption priority mode selection switch during the driving without the operation of the internal combustion engine, drivability such as acceleration performance may be slightly deteriorated, however, the start of the internal combustion engine may be decreased and the engine may be continuously stopped, so that the fuel consumption may be improved.

The hybrid vehicle may further includes: an accelerator operation amount detecting unit configured to detect an accelerator operation amount by a driver; and an accelerator operation determination module configured to determine whether or not a driver's accelerator operation is rough in accordance with the detected accelerator operation amount. In this case, the engine start condition setting module may set the start condition to the first condition when the accelerator operation determination unit determines that the driver's accelerator operation is not rough and the fuel consumption priority mode selection switch is turned on during the driving without the operation of the internal combustion engine. Further, the engine start condition setting module may set the start condition to the second condition when the accelerator operation determination unit determines that the driver's accelerator operation is rough and the fuel consumption priority mode selection switch is turned on during the driving without the operation of the internal combustion engine. If the driver's accelerator operation (acceleration work) is rough, frequent acceleration and deceleration occur, so that the fuel consumption may be deteriorated. Accordingly, both the drivability and the improvement of the fuel consumption may be ensured by the determination whether or not the accelerator operation is rough based on the driver's accelerator operation amount and the setting the start condition of the internal combustion engine to the first or second condition in accordance with a result of the determination relating the accelerator operation when the fuel consumption priority mode selection switch is turned on during the driving without the operation of the internal combustion engine.

The hybrid vehicle may further includes a power transmitting mechanism having an axle-side rotational element connected to a predetermined axle, and an engine-side rotational element connected to an engine shaft of the internal combustion engine and configured to differentially rotate with respect to the axle-side rotational element, the power transmitting mechanism capable of outputting at least a part of power from the engine shaft to the axle side. The power transmitting mechanism may be an electric power-mechanical power input output structure connected to the predetermined axle and the engine shaft of the internal combustion engine and outputting at least a part of power from the internal combustion engine to the axle side with input/output of electric power and mechanical power, the electric power-mechanical power input output structure supplying and receiving electric power from the accumulator. The electric power-mechanical power input output structure may include a power generation motor capable of inputting and outputting power, and a three shaft-type power input output assembly connected with three shafts, the predetermined axle, the engine shaft of the internal combustion engine, and a rotating shaft of the power generation motor. In this case, the three shaft-type power input output assembly may be configured to input and output power to one remaining shaft, based on input and output of powers from and to any two shafts selected among the three shaft, and the motor may be capable of outputting power to the predetermined axle or another axle different from the predetermined axle. The power transmitting mechanism may be a continuously variable transmission.

A control method of a hybrid vehicle according to the present invention is a control method of a hybrid vehicle including an internal combustion engine capable of outputting power for driving the vehicle, a motor capable of outputting power for driving the vehicle, an accumulator capable of supplying electric power to the motor and a fuel consumption priority mode selection switch to select a fuel consumption priority mode that gives priority to fuel consumption, the method comprising the steps of: (a) setting a start condition of the internal combustion engine to a first condition when the fuel consumption priority mode selection switch is turned off during a driving without an operation of the internal combustion engine, and setting the start condition of the internal combustion engine to a second condition giving priority to fuel consumption in comparison with the first condition when the fuel consumption priority mode selection switch is turned on during the driving without the operation of the internal combustion engine; and (b) controlling the internal combustion engine and the motor so that a driving power equivalent to a driving force demand required for driving the vehicle is ensured without a start of the internal combustion engine when the set start condition is not satisfied during the driving without the operation of the internal combustion engine, and controlling the internal combustion engine and the motor so that the driving power equivalent to the driving force demand is ensured with the start of the internal combustion engine when the set start condition is satisfied during the driving without the operation of the internal combustion engine.

According to the method, it is possible to allow drivers and the like to freely select whether or not to stop the internal combustion engine as long as possible for giving priority to fuel consumption by only operating the fuel consumption priority mode selection switch. Further, the stop of the internal combustion engine may be maintained until the satisfaction of the second condition giving priority to fuel consumption in comparison with the first condition when the fuel consumption priority mode selection switch is turned on during the driving without the operation of the internal combustion engine, so that the fuel consumption may be improved by reducing unnecessary engine starts.

The second condition used at the step (a) may have a tendency to permit the stop of the internal combustion engine to continue in comparison with the first condition.

The first and second conditions used at the step (a) may be respectively satisfied when the driving force demand is equal to or more than a predetermined threshold, and the threshold in the second condition may be larger than that in the first condition.

The control method of a hybrid vehicle may further comprise the step of (c) determining whether or not a driver's accelerator operation is rough in accordance with an accelerator operation amount by the driver. In this case, the step (b) may set the start condition to the first condition when the step (c) determines that the driver's accelerator operation is not rough and the fuel consumption priority mode selection switch is turned on during the driving without the operation of the internal combustion engine, and step (b) may set the start condition to the second condition when the step (c) determines that the driver's accelerator operation is rough and the fuel consumption priority mode selection switch is turned on during the driving without the operation of the internal combustion engine.

Another hybrid vehicle according to the present invention is a hybrid vehicle including: an internal combustion engine capable of outputting power for driving the vehicle; a motor capable of outputting power for driving the vehicle; an accumulator capable of supplying electric power to the motor; a mode selection switch to select a mode having tendency to make the internal combustion engine hard to start in comparison with a normal state; an engine start condition setting module configured to set a start condition of the internal combustion engine to a first condition when the mode selection switch is turned off during a driving without an operation of the internal combustion engine, the engine start condition setting module setting the start condition of the internal combustion engine to a second condition having tendency to make the internal combustion engine hard to start in comparison with the first condition when the mode selection switch is turned on during the driving without the operation of the internal combustion engine; a driving force demand setting module configured to set a driving force demand required for driving the vehicle; and an engine stop driving control module configured to control the internal combustion engine and the motor so that a driving power equivalent to the set driving force demand is ensured without a start of the internal combustion engine when the set engine start condition is not satisfied during the driving without the operation of the internal combustion engine, the engine stop driving control module controlling the internal combustion engine and the motor so that the driving power equivalent to the set driving force demand is ensured with the start of the internal combustion engine when the set engine start condition is satisfied during the driving without the operation of the internal combustion engine.

In the hybrid vehicle, it is possible to allow drivers and the like to freely select whether or not to make the internal combustion engine hard to start for giving priority to an improvement of the fuel consumption by only operating the mode selection switch. Further, the stop of the internal combustion engine may be maintained until the satisfaction of the second condition having tendency to make the internal combustion engine hard to start in comparison with the first condition when the mode selection switch is turned on during the driving without the operation of the internal combustion engine, so that the fuel consumption may be improved by reducing unnecessary engine starts.

Another control method of a hybrid vehicle is a control method of a hybrid vehicle including an internal combustion engine capable of outputting power for driving the vehicle, a motor capable of outputting power for driving the vehicle, an accumulator capable of supplying electric power to the motor, and a mode selection switch to select a mode having tendency to make the internal combustion engine hard to start in comparison with a normal state, the method comprising the steps of: (a) setting a start condition of the internal combustion engine to a first condition when the mode selection switch is turned off during a driving without an operation of the internal combustion engine, and setting the start condition of the internal combustion engine to a second condition having tendency to make the internal combustion engine hard to start in comparison with the first condition when the mode selection switch is turned on during the driving without the operation of the internal combustion engine; and (b) controlling the internal combustion engine and the motor so that a driving power equivalent to a driving force demand required for driving the vehicle is ensured without a start of the internal combustion engine when the set start condition is not satisfied during the driving without the operation of the internal combustion engine, and controlling the internal combustion engine and the motor so that the driving power equivalent to the driving force demand is ensured with the start of the internal combustion engine when the set start condition is satisfied during the driving without the operation of the internal combustion engine.

According to the method, it is possible to allow drivers and the like to freely select whether or not to make the internal combustion engine hard to start for giving priority to an improvement of the fuel consumption by only operating the mode selection switch. Further, the stop of the internal combustion engine may be maintained until the satisfaction of the second condition having tendency to make the internal combustion engine hard to start in comparison with the first condition when the mode selection switch is turned on during the driving without the operation of the internal combustion engine, so that the fuel consumption may be improved by reducing unnecessary engine starts.

BEST MODES OF CARRYING OUT THE INVENTION

Now, the best mode for carrying out the present invention will be described with reference to an embodiment.

Figure 1:
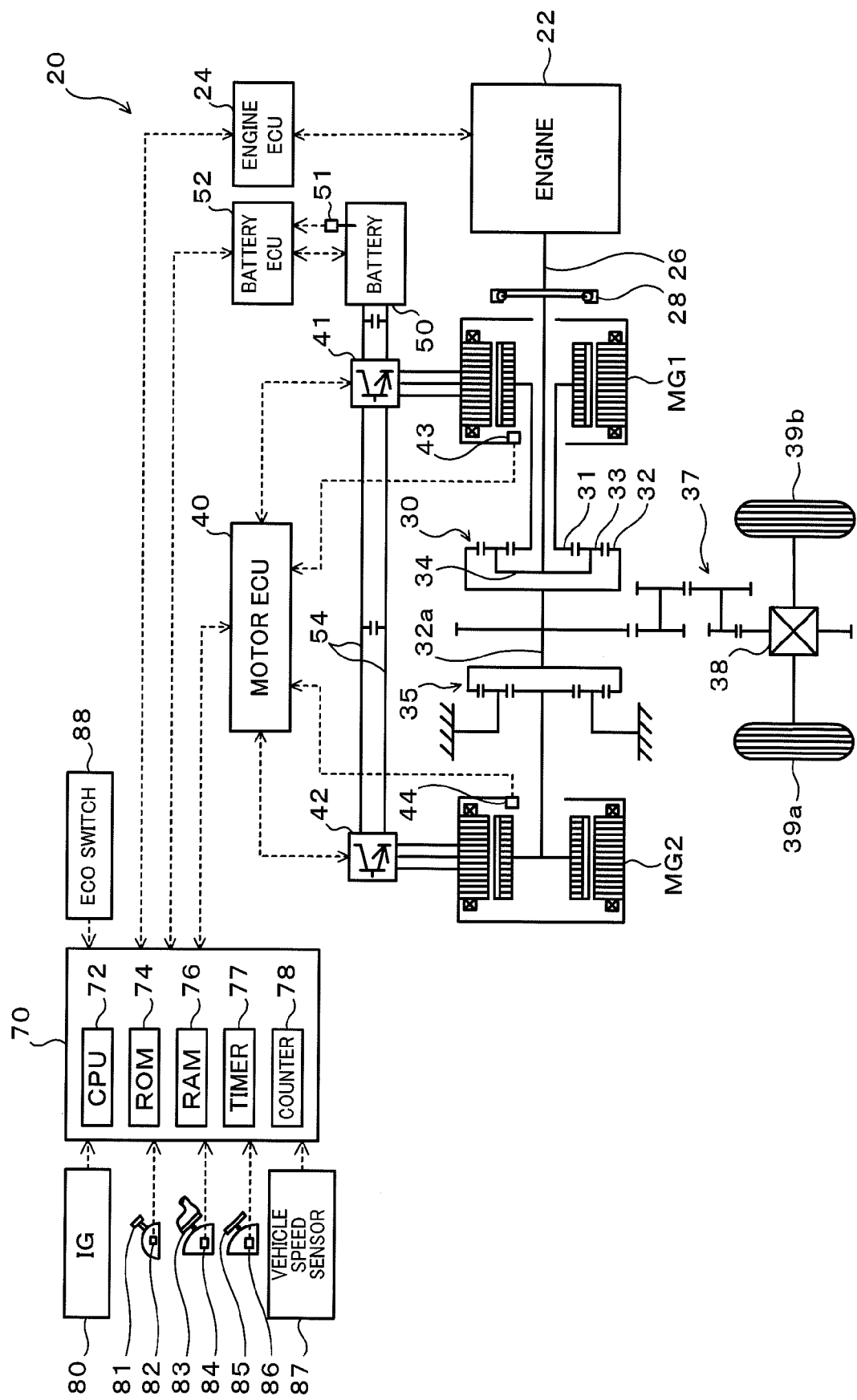
FIG. 1 is a schematic block diagram of a hybrid vehicle 20 according to an embodiment of the present invention.

FIG. 1 schematically illustrates the configuration of a hybrid vehicle 20 in an embodiment of the invention. The hybrid vehicle 20 of the illustrated configuration includes an engine 22, a three shaft-type power distribution integration mechanism 30 connected via a damper 28 to a crankshaft 26 or an output shaft of the engine 22, a motor MG1 connected to the power distribution integration mechanism 30 and designed to have power generation capability, a reduction gear 35 attached to a ring gear shaft 32a as an axle connected to the power distribution integration mechanism 30, a motor MG2 connected to the ring gear shaft 32a via the reduction gear 35, and a hybrid electronic control unit 70 (hereinafter referred to as "hybrid ECU") configured to control the operations of the whole hybrid vehicle 20.

The engine 22 is constructed as an internal combustion engine designed to consume a hydrocarbon fuel, such as gasoline or light oil, and thereby generate power. The engine 22 is under operation controls, such as fuel injection control, ignition timing control, and intake air flow control, of an engine electronic control unit 24 (hereinafter referred to as "engine ECU"). The engine ECU 24 inputs diverse signals from various sensors mounted on the engine 22 to measure and detect the operating conditions of the engine 22. The engine ECU 24 establishes communication with the hybrid ECU 70 to control the operations of the engine 22 in response to control signals from the hybrid ECU 70 and with reference to the diverse signals from the various sensors and to output data regarding the operating conditions of the engine 22 to the hybrid ECU 70 according to the requirements.

The power distribution integration mechanism 30 includes a sun gear 31 as an external gear, a ring gear 32 as an internal gear arranged concentrically with the sun gear 31, multiple pinion gears 33 arranged to engage with the sun gear 31 and with the ring gear 32, and a carrier 34 arranged to hold the multiple pinion gears 33 in such a manner as to allow both their revolutions and their rotations on their axes. The power distribution integration mechanism 30 is thus constructed as a planetary gear mechanism including the sun gear 31, the ring gear 32, and the carrier 34 as the rotational elements of differential motions. The carrier 34 as an engine-side rotational element, the sun gear 31, and the ring gear 32 as an axle-side rotational element in the power distribution integration mechanism 30 are respectively connected to the crankshaft 26 of the engine 22, to the motor MG1, and to the reduction gear 35 via the ring gear shaft 32a. When the motor MG1 functions as a generator, the power distribution integration mechanism 30 distributes the power of the engine 22 input via the carrier 34 into the sun gear 31 and the ring gear 32 corresponding to their gear ratio. When the motor MG1 functions as a motor, on the other hand, the power distribution integration mechanism 30 integrates the power of the engine 22 input via the carrier 34 with the power of the motor MG1 input via the sun gear 31 and outputs the integrated power to the ring gear 32. The power output to the ring gear 32 is transmitted from the ring gear shaft 32a through a gear mechanism 37 and a differential gear 38 and is eventually output to drive wheels 39a and 39b of the hybrid vehicle 20.

The motors MG1 and MG2 are constructed as known synchronous motor generators to enable operations as both a generator and a motor. The motors MG1 and MG2 receive and supply electric power to a battery 50 as a secondary cell via inverters 41 and 42. Power lines 54 connecting the battery 50 with the inverters 41 and 42 are structured as common positive bus and negative bus shared by the inverters 41 and 42. Such connection enables electric power generated by one of the motors MG1 and MG2 to be consumed by the other motor MG2 or MG1. The battery 50 may thus be charged with surplus electric power generated by either of the motors MG1 and MG2, while being discharged to supplement insufficient electric power. The battery 50 is neither charged nor discharged upon the balance of the input and output of electric powers between the motors MG1 and MG2. Both the motors MG1 and MG2 are driven and controlled by a motor electronic control unit 40 (hereinafter referred to as "motor ECU"). The motor ECU 40 inputs various signals required for driving and controlling the motors MG1 and MG2, for example, signals representing rotational positions of rotors in the motors MG1 and MG2 from rotational position detection sensors 43 and 44 and signals representing phase currents to be applied to the motors MG1 and MG2 from current sensors (not shown). The motor ECU 40 outputs switching control signals to the inverters 41 and 42. The motor ECU 40 also computes rotational speeds Nm1 and Nm2 of the rotors in the motors MG1 and MG2 according to a rotational speed computation routine (not shown) based on the output signals of the rotational position detection sensors 43 and 44. The motor ECU 40 establishes communication with the hybrid ECU 70 to drive and control the motors MG1 and MG2 in response to control signals received from the hybrid ECU 70 and to output data regarding the operating conditions of the motors MG1 and MG2 to the hybrid ECU 70 according to the requirements.

The battery 50 is under control and management of a battery electronic control unit 52 (hereinafter referred to as "battery ECU"). The battery ECU 52 inputs various signals required for management and control of the battery 50, for example, an inter-terminal voltage from a voltage sensor (not shown) located between terminals of the battery 50, a charge-discharge current from a current sensor (not shown) located in the power line 54 connecting with the output terminal of the battery 50, and a battery temperature Tb from a temperature sensor 51 attached to the battery 50. The battery ECU 52 outputs data regarding the operating conditions of the battery 50 by data communication to the hybrid ECU 70 and the engine ECU 24 according to the requirements. The battery ECU 52 also executes various arithmetic operations for management and control of the battery 50. A remaining capacity or state of charge SOC of the battery 50 is calculated from an integrated value of the charge-discharge current measured by the current sensor.

The hybrid ECU 70 is constructed as a microprocessor including a CPU 72, a ROM 74 configured to store processing programs, a RAM 76 configured to temporarily store data, a timer 77 configured to perform a time measurement process, a counter 78 configured to perform a count process, input and output ports (not shown), and a communication port (not shown). The hybrid ECU 70 inputs, via its input port, an ignition signal from an ignition switch (start switch) 80, a shift position SP or a current setting position of a shift lever 81 from a shift position sensor 82, an accelerator opening Acc or the driver's depression amount of an accelerator pedal 83 from an accelerator pedal position sensor 84, a brake pedal stroke BS or the driver's depression amount of a brake pedal 85 from a brake pedal stroke sensor 86, and a vehicle speed V from a vehicle speed sensor 87. An ECO switch (fuel consumption priority mode selection switch) 88 to select, as a control mode at a time of driving, an ECO mode (fuel consumption priority mode) that gives priority to fuel consumption over a reduction of noise and vibration is disposed in the vicinity of the driver's seat of the hybrid vehicle 20 of the present embodiment. The ECO switch 88 is also connected to the hybrid ECU 70. When the ECO switch 88 is turned on by the driver or the like, a predetermined ECO flag Feco that is set to value "0" during normal operation (when the ECO switch 88 is turned off) is set to value "1", and the hybrid vehicle 20 is controlled according to various control procedures that are previously defined to give priority to efficiency. As described above, the hybrid ECU 70 is connected via the communication port with the engine ECU 24, the motor ECU 40, the battery ECU 52, and the like, and exchanges various control signals and data with the engine ECU 24, the motor ECU 40, the battery ECU 52, and the like.

The hybrid vehicle 20 of the embodiment constructed as described above sets a torque demand, which is to be output to the ring gear shaft 32a or the driveshaft linked with an axle of the hybrid vehicle 20, based on the vehicle speed V and the accelerator opening Acc corresponding to the driver's depression amount of the accelerator pedal 83, and controls the operations of the engine 22, the motors MG1 and MG2 to ensure output of power equivalent to the set torque demand to the ring gear shaft 32a. There are several drive control modes of the engine 22, the motors MG1 and MG2. In a torque conversion drive mode, while the engine 22 is driven and controlled to ensure output of the power equivalent to the torque demand, the motors MG1 and MG2 are driven and controlled to enable all the output power of the engine 22 to be subjected to torque conversion by the power distribution integration mechanism 30, the motors MG1 and MG2 and to be output to the ring gear shaft 32a. In a charge-discharge drive mode, the engine 22 is driven and controlled to ensure output of power corresponding to the sum of a power demand and electric power required for charging the battery 50 or electric power to be discharged from the battery 50. The motors MG1 and MG2 are driven and controlled to enable all or part of the output power of the engine 22 with charge or discharge of the battery 50 to be subjected to torque conversion by the power distribution integration mechanism 30, the motors MG1 and MG2 and to ensure output of the power demand to the ring gear shaft 32a. In a motor drive mode, the motor MG2 is driven and controlled to ensure output of power equivalent to the power demand to the ring gear shaft 32a, while the engine 22 stops its operation. In the hybrid vehicle 20 of the embodiment, the engine 22 is stopped and the driving mode is changed to the motor drive mode in which the motor is made to output torque equivalent to the torque demand when a predetermined engine stop condition is satisfied in the torque conversion drive mode or the like in which the engine 22 is operated. Further, in the hybrid vehicle 20, the engine 22 is started and the driving mode is changed to the torque conversion drive mode or the like when a predetermined engine start condition is satisfied in the motor drive mode in which the engine 22 is stopped.

Here, the torque demand required for driving the vehicle is set in accordance with the driver's depression amount of an accelerator pedal 83 as described above. Thus, if the driver's operation of the accelerator pedal 83 (acceleration work) is rough, the start of the engine 22 in the motor drive mode and the stop of the engine 22 thereafter are frequently occur, so that the fuel consumption may be deteriorated. Accordingly, it is important to grasp a state of the driver's operation of the accelerator pedal 83 for improving the fuel consumption of the hybrid vehicle 20. Because of this, in the hybrid vehicle 20 of the embodiment, an acceleration work determination routine shown in FIG. 2 is executed by a hybrid electric control unit 70 at predetermined time intervals so as to determine whether or not the driver's operation of the accelerator pedal 83 is rough.

Figure 2:
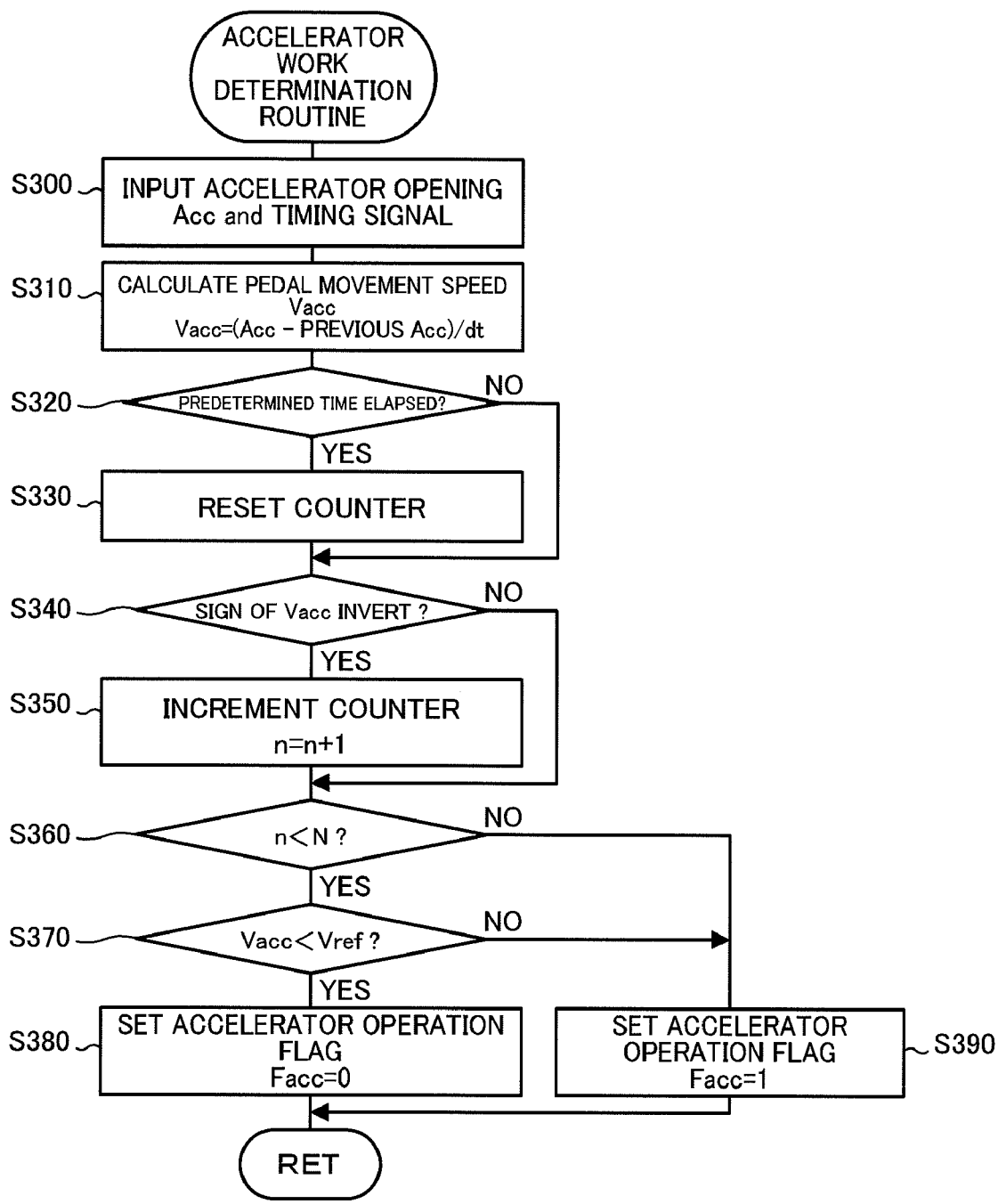
FIG. 2 is a flowchart illustrating an example of an acceleration work determination routine executed by a hybrid electric control unit 70 in the embodiment.

At start of the acceleration work determination routine in FIG. 2, the CPU 72 of the hybrid ECU 70 inputs the accelerator opening Acc from the accelerator pedal position sensor 84 and a timing signal from the timer 77 (Step S300), and calculates a pedal movement speed Vacc that is a movement speed (open/close speed) of the accelerator pedal 83 based on the input accelerator opening Acc (Step S310). The embodiment uses a quotient of a difference between the accelerator opening Acc input at Step S300 and an accelerator opening Acc at previous execution of the routine (previous value) by an execution interval dt of the routine as the pedal movement speed Vacc. After the processing at Step S310, the CPU 72 determines whether or not a predetermined time T elapses after the start of the routine or a previous reset of the counter 78 based on the timing signal from the timer 77 (Step S320). The CPU 72 resets the counter 78 when the predetermined time T elapses after the previous reset of the counter 78 and the like (Step S330). The CPU 72 skips the processing of Step S330 when the predetermined time T does not elapse after the previous reset of the counter 78 and the like. Then, the CPU 72 compares the previous value of the accelerator movement speed Vacc and the pedal movement value Vacc (present value) calculated at Step S310 and determines whether or not a sign of the pedal movement speed Vacc inverts, that is whether or not the accelerator opening Acc changes between an open side and a close side (Step S340). When the sign of the pedal movement speed Vacc inverts (Step S350), the CPU 72 increments the counter 78 by value "1". The CPU 72 skips the processing of Step S350 when the sign of the pedal movement speed Vacc does not invert. Thus, the counter 78 counts the number of an inversion of the sign of the pedal movement speed Vacc, that is, the number of the change between a depression and a return of the accelerator pedal 83 from the start of the routine or the previous reset to a lapse of the predetermined time T. Then, the CPU 72 determines whether or not the count "n" of the counter 78 is less than a predetermined threshold "N" (Step S360). When the count "n" is less than the threshold "N", the CPU 72 further determines whether or not the pedal movement speed Vacc calculated at Step S310 is less than a predetermined value Vref (Step S370). When the count "n" is less than the threshold "N" and the pedal movement speed Vacc is less than the predetermined value Vref, the CPU 72 determines that the driver's accelerator operation is not rough but stable and gentle, and sets a predetermined accelerator operation flag Facc to value "0" (Step S380). Then, the CPU 72 terminates the routine. On the other hand, a frequent change between the depression and the return of the accelerator pedal 83 may occur within the predetermined time T when determined that the count "n" of the counter 78 is equal to or more than the threshold "N" (Step S360). In this case, the CPU 72 determines that the driver's accelerator operation is rough, and sets the accelerator operation flag Facc to value "1" (Step S390). Then, the CPU 72 terminates the routine. When determined that the count "n" is less than the threshold "N" and the pedal movement speed Vacc is equal to or more than the predetermined value Vref, the accelerator pedal 83 must has been abruptly depressed by the driver. Accordingly, the CPU 72 determines that the driver's accelerator operation is rough and sets the accelerator operation flag Facc to value "1" (Step S390). Then, the CPU 72 terminates the routine. According to the above accelerator work determination routine, it is possible to accurately grasp the state of the driver's operation of the accelerator pedal 83 and reflect the grasp results to the improvement of the fuel consumption of the hybrid vehicle 20.

Figure 3:
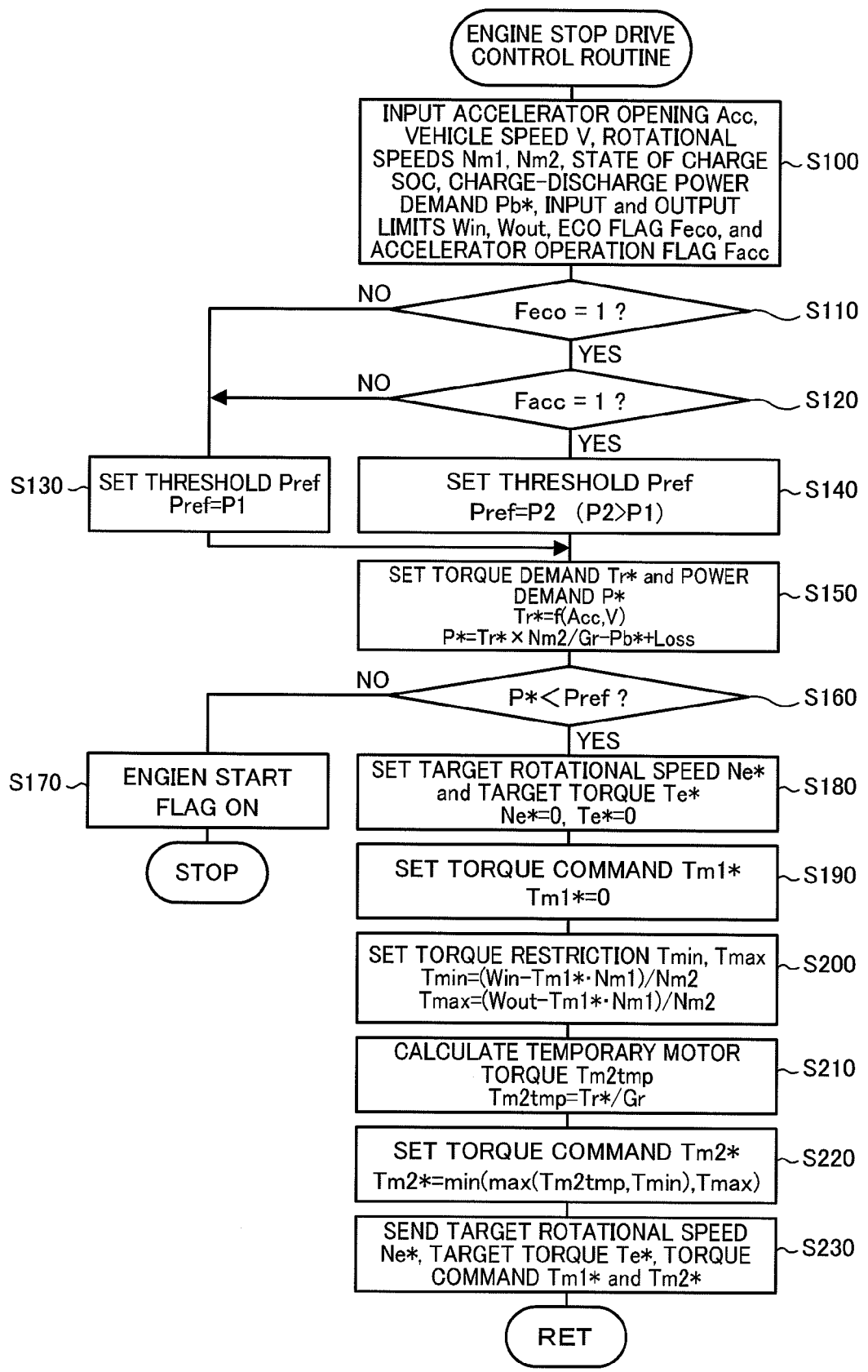
FIG. 3 is a flowchart illustrating an example of an engine stop drive control routine executed by a hybrid electric control unit 70 in the embodiment.

Next, the operation in the motor drive mode of the hybrid vehicle 20 with the above configuration will be described. FIG. 3 is a flowchart illustrating an example of an engine stop drive control routine that is executed by the hybrid ECU 70 at predetermined time intervals (for example, at ever several msec) when the hybrid vehicle 20 is driven without an operation of an engine 22.

At start of the drive control routine in FIG. 3, the CPU 72 of the hybrid ECU 70 executes input processing of data required for control such as the accelerator opening Acc from the accelerator pedal position sensor 84, the vehicle speed V from the vehicle speed sensor 87, the rotational speeds Nm1, Nm2 of the motors MG1, MG2, the state of charge SOC of the battery 50, a charge-discharge power demand Pb*, an input limit Win that is an allowable charging electric power to be charged into the battery 50 and an output limit Wout that is an allowable discharging electric power to be discharged from the battery 50, a value of the ECO flag Feco, and a value of the accelerator operation flag Facc (Step S100). The rotational speeds Nm1 and Nm2 of the motors MG1 and MG2 are input from the motor ECU 40 by communication. The state of charge SOC of the battery 50 is input from the battery ECU 52 by communication. The charge-discharge power demand Pb* is set as electric power for charging or discharging the battery 50 according to the state of charge SOC of the battery 50 and the like by the battery ECU 52 and is input from the battery ECU 52 by communication. The input limit Win and the output limit Wout are set based on the battery temperature Tb of the battery 50 and the state of charge SOC of the battery 50 and are input from the battery ECU 52 by communication. Further, the value of the accelerator operation flag Facc is derived from a predetermined storage area storing a value that is set through the accelerator work determination routine in FIG. 2.

After the data input at Step S100, the CPU 72 determines whether or not the input ECO flag Feco is value "1", that is, whether or not the ECO switch 88 is turned on (Step S110). When the ECO switch 88 is turned off and the value of the ECO flag Feco is value "0", the CPU 72 sets a threshold value Pref with respect to a power demand required for whole of the vehicle as an engine start condition to a predetermined value P1 (Step S130). The value P1 is defined through experiments and analyses while giving priority to drivability such as a response to an increase demand of the driving force through the accelerator pedal 83 or an acceleration performance rather than the fuel consumption of the engine 22. On the other hand, when the ECO switch 88 is turned on and the value of the ECO flag Feco is value "1", the CPU 72 determines whether or not the input accelerator operation flag Facc is value "1", that is, whether or not the driver's accelerator operation is rough (Step S120). When determined that the driver's accelerator operation is not rough but stable and gentle because the accelerator operation flag Facc is value "0", the CPU 72 sets the threshold value Pref as the start condition of the engine 22 to the above value P1 as same as the turn-off condition of the ECO switch 88(Step S130). On the other hand, when an affirmative determination is made at Step S120, that is, when determined that the driver's accelerator operation is rough during the turn-on condition of the ECO switch 88, the CPU 72 sets the threshold value Pref as the start condition of the engine 22 to a value P2 larger than the value P1 (Step S140). The value P2 is defined through experiments and analyses while giving priority to the fuel consumption of the engine 22 rather than the drivability such as the response to the increase demand of the driving force through the accelerator pedal 83 or an acceleration performance rather than the fuel consumption of the engine 22.

Figure 4:
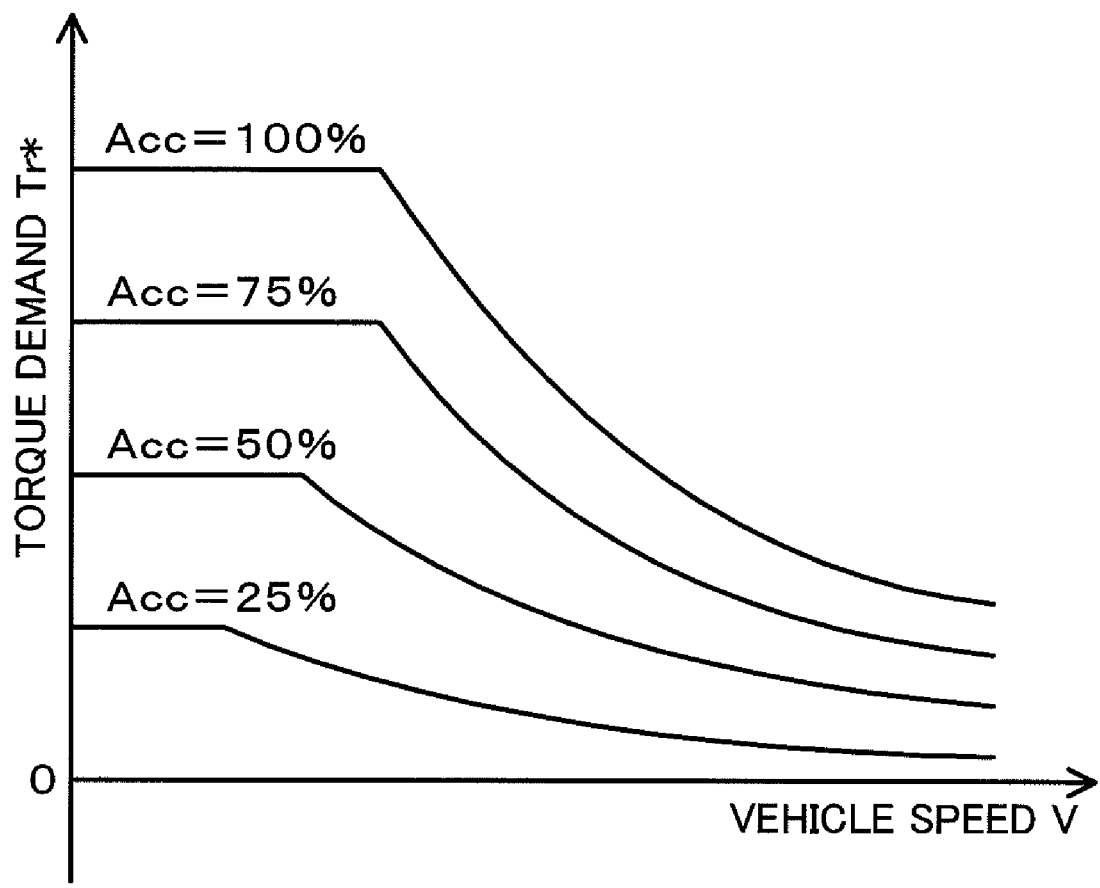
FIG. 4 is a view illustrating an example of a torque demand setting map.

After setting the threshold value Pref at Step S130 or S140, the CPU 72 sets a torque demand Tr* to be output to the ring gear shaft 32a or the axle connected to drive wheels 39a and 39b based on the accelerator opening Acc and the input vehicle speed V input at Step S100, and sets a power demand P* required for whole of the vehicle (Step S150). In the embodiment, the torque demand Tr* corresponding to the given accelerator opening Acc and the given vehicle speed V is derived from a torque demand setting map previously stored in the ROM 74 and defining a relationship between the accelerator opening Acc, the vehicle speed V and the torque demand Tr*. FIG. 4 illustrates an example of the torque demand setting map. In the embodiment, the power demand P* is calculated as the sum of a product of the set torque demand Tr* and a rotational speed Nr of the ring gear shaft 32a, the charge-discharge power demand Pb*, and a potential loss. The rotational speed Nr of the ring gear shaft 32a is obtained by dividing the rotational speed Nm2 of the motor MG2 by a gear ratio Gr of the reduction gear 35 or by multiplying the vehicle speed V by a predetermined conversion factor k. Then, the CPU 72 determines whether or not the set power demand P* is less than the threshold value Pref (Step S160). When the power demand P* is equal to or more than the threshold value Pref, the CPU 72 considers the power demand P* to be output from the engine 22 and sets an engine start flag to instruct an execution of an engine start drive control routine that is not shown (Step S170). Then, the CPU 72 terminates the routine. The engine start drive control routine starts the engine 22 through a cranking by the motor MG1 and controls the motor MG2 so as to cancel a driving torque that acts on the ring gear shaft 32a while cranking the engine 22 and ensure a torque equivalent to the torque command Tr* on the ring gear shaft 32a.

When the power demand P* is less than the threshold Pref, the CPU 72 sets both a target rotational speed Ne* and a target torque Te* as a target drive point of the engine 22 to value "0" (Step S180), and sets a torque command Tm1* of the motor MG1 to value "0" (Step S190) in order to maintain the stop of the engine 22. Further, the CPU 72 calculates a lower torque restriction Tmin and an upper torque restriction Tmax as allowable minimum and maximum torques to be output from the motor MG2 according to the following equations (1) and (2) by dividing a deviation between the output limit Wout or the input limit Win of the battery 50 and power consumption (generated electric power) of the motor MG1 that is a product of the torque command Tm1* and the current rotational speed Nm1 of the motor MG1 by the rotational speed Nm2 of the motor MG2 (Step S200). Next, the CPU 72 calculates a temporary motor torque Tm2tmp as a torque value to be output from the motor MG2, based on the torque demand Tr* and the gear ratio Gr of the reduction gear 35 according to Equation (3) given below (Step S210). Then, the CPU 72 sets a torque command Tm2* of the motor MG2 to a value obtained by limiting the calculated temporary motor torque Tm2tmp by the lower and the upper torque restrictions Tmin and Tmax (Step S220). Setting the torque command Tm2* of the motor MG2 in this manner restricts the torque to be output to the ring gear shaft 32a or the axle in the range of the input limit Win and the output limit Wout of the battery 50. After setting the target rotational speed Ne* and the target torque Te* of the engine 22 and the torque commands Tm1* and Tm2* of the motors MG1 and MG2, the CPU 72 sends the target rotational speed Ne* and the target torque Te* of the engine 22 to the engine ECU 24 and the torque commands Tm1* and Tm2* of the motors MG1 and MG2 to the motor ECU 40 (Step S230) and returns to Step S100 to repeat the processing of and after Step S100. The engine ECU 24 receives the target rotational speed Ne* and the target torque Te* and performs control to obtain the target rotational speed Ne* and the target torque Te*. The motor ECU 40 receives the torque commands Tm1* and Tm2* and performs switching control of switching elements included in the respective inverters 41 and 42 so that the motor MG1 is driven in accordance with the torque command Tm1* and the motor MG2 is driven in accordance with the torque command Tm2*.

$$Tmin = (Win - Tm1^* \cdot Nm1)/Nm2 \tag{1}$$

$$Tmax = (Wout - Tm1^* \cdot Nm1)/Nm2 \tag{2}$$

$$Tm2tmp = Tr^*/Gr \tag{3}$$

As has been described above, in the hybrid vehicle 20 of the embodiment, the threshold value Pref defining the start condition of the engine 22 is set to the value P1 (first condition) when the ECO switch 88 or the fuel consumption priority mode selection switch is turned off during the driving without the operation of the engine 22 (Step S130). Then, the engine 22 and the motors MG1 and MG2 are controlled so that the torque equivalent to the torque demand Tr* is ensured and the engine 22 is started as necessary (Step S170) in accordance with the threshold value Pref (Steps S150-S230). When the ECO switch 88 is turned on during the driving without the operation of the engine 22, the threshold value Pref is set to the value P2 (second condition) that is larger than the value P1 and gives priority to the fuel consumption in comparison with the turn-off condition of the ECO switch 88 in response to the determination that the driver's operation of the accelerator pedal 83 is rough 8A step S120) through the accelerator work determination routine in FIG. 2 (Step S140). Then, the engine 22 and the motors MG1 and MG2 are controlled so that the torque equivalent to the torque demand Tr* is ensured and the engine 22 is started as necessary (Step S170) in accordance with the threshold value Pref (Steps S150-S230). Thus, in the hybrid vehicle 20 of the embodiment, it is possible to allow drivers and the like to freely select whether or not to stop the operation of the engine 22 as long as possible for giving priority to the fuel consumption by only operating the ECO switch 88. That is, in the hybrid vehicle 20, while the threshold value Pref as the start condition of the engine 22 is set to the value P1 due to the turn-off of the ECO switch 88 during the driving without the operation of the engine 22, the engine 22 is started when the power demand P* based on the torque demand Tr* becomes large to some extent and reaches the threshold value Pref. Accordingly, though the improvement of the fuel consumption may be slightly deteriorated, it is possible to quickly respond to the increase demand of the torque demand Tr* (power demand P*) so as to ensure drivability such as acceleration performance. Further, while the threshold value Pref is set to the value P2 larger than the value P1 due to the turn-on of the ECO switch 88 during the driving without the operation of the engine 22, a tendency to maintain the stop of the engine 22 may become strong and drivability such as acceleration performance may be slightly deteriorated. However, the start of the engine 22 may be decreased and the engine 22 may be continuously stopped, so that the fuel consumption may be improved. Further, in the hybrid vehicle 20, the accelerator work determination routine in FIG. 2 is executed so as to determine whether or not the driver's operation of the accelerator pedal 83 is rough based on the accelerator opening Acc detected by the accelerator pedal position sensor 84. Then, the threshold value Pref is set to the value P2 when the accelerator work determination routine in FIG. 2 determines that the driver's accelerator operation is rough and the ECO switch 88 is turned on during the driving without the operation of the engine 22. Accordingly, both the drivability and the improvement of the fuel consumption may be ensured by setting the start condition of the engine 22 in the motor drive mode in accordance with both the operational state of the ECO switch 88 and the driver's accelerator operation.

Figure 5:
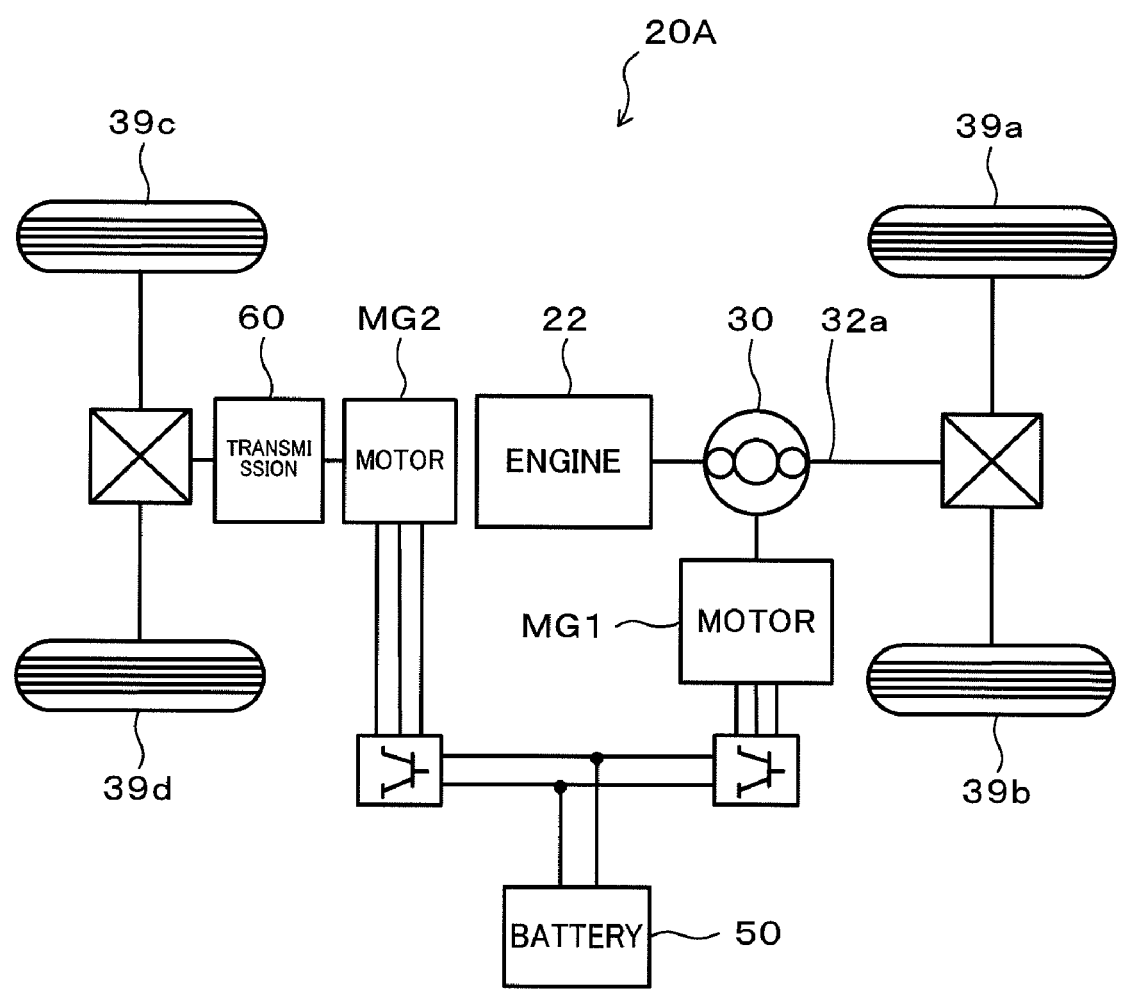
FIG. 5 is a schematic block diagram of a hybrid vehicle 20A according to a modification of the present invention.

Although the hybrid vehicle 20 of the above described embodiment is a vehicle that outputs the power of the motor MG2 to an axle connected to the ring gear shaft 32a, an object for application of the present invention is not limited thereto. More specifically, as in the case of a hybrid vehicle 20A as a modification example shown in FIG. 5, the present invention may also be applied to a vehicle in which the power of the motor MG2 is output to an axle (axle connected to wheels 39c and 39d in FIG. 5) that is different from the axle (axle to which the wheels 39a and 39b are connected) that is connected to the ring gear shaft 32a. Further, although the hybrid vehicle 20 of the above described embodiment is a vehicle that outputs the power of the engine 22 to the ring gear shaft 32a as an axle connected to the wheels 39a and 39b via the power distribution and integration mechanism 30, an object for application of the present invention is not limited thereto.

Figure 6:
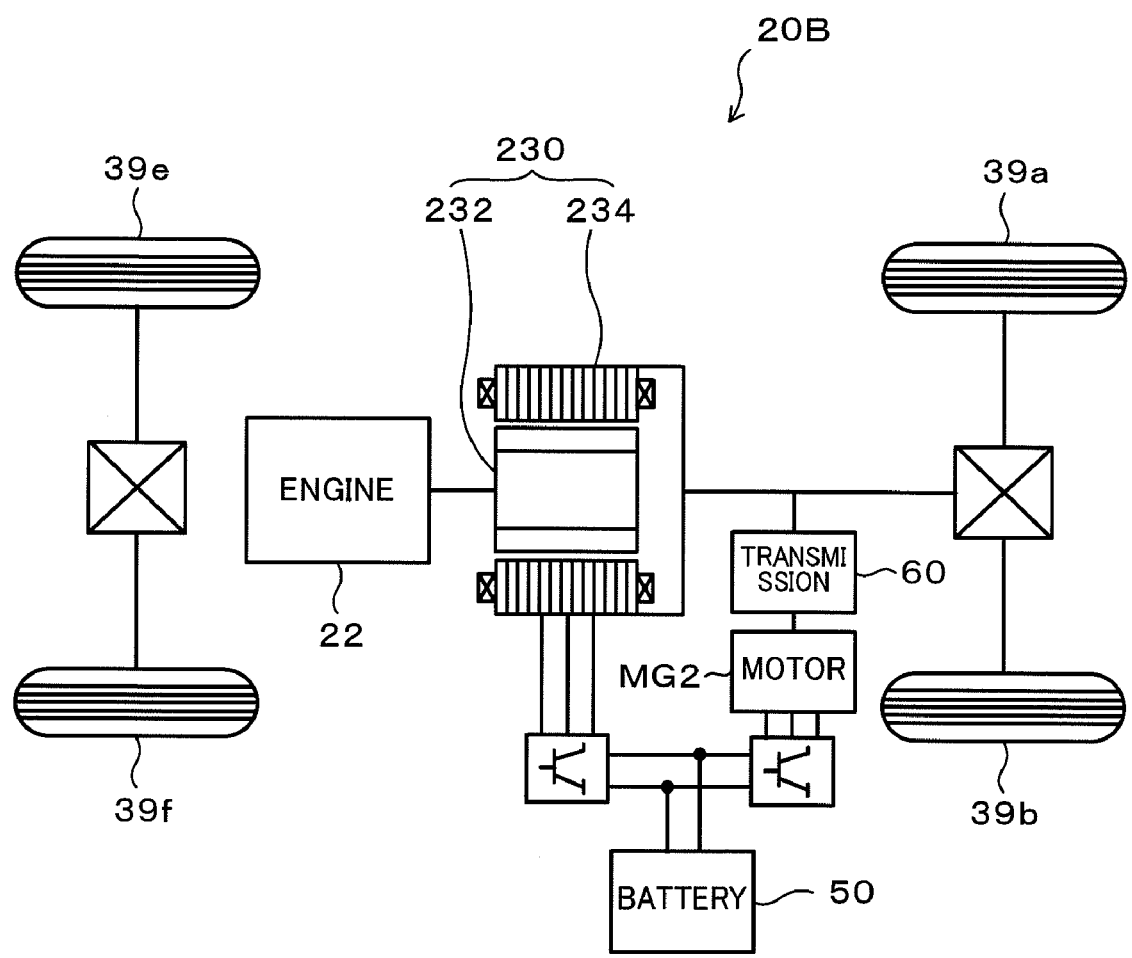
FIG. 6 is a schematic block diagram of a hybrid vehicle 20B according to a further modification of the present invention.

More specifically, as in the case of a hybrid vehicle 20B as a modification example shown in FIG. 6, the present invention may also be applied to a vehicle that includes a pair-rotor motor 230 that has an inner rotor 232 connected to the crankshaft of the engine 22, and an outer rotor 234 connected to the axle that outputs the power to the wheels 39a and 39b and that transmits a part of the power output from the engine 22 to the axle while converting the remainder of the power into electric power.

Figure 7:
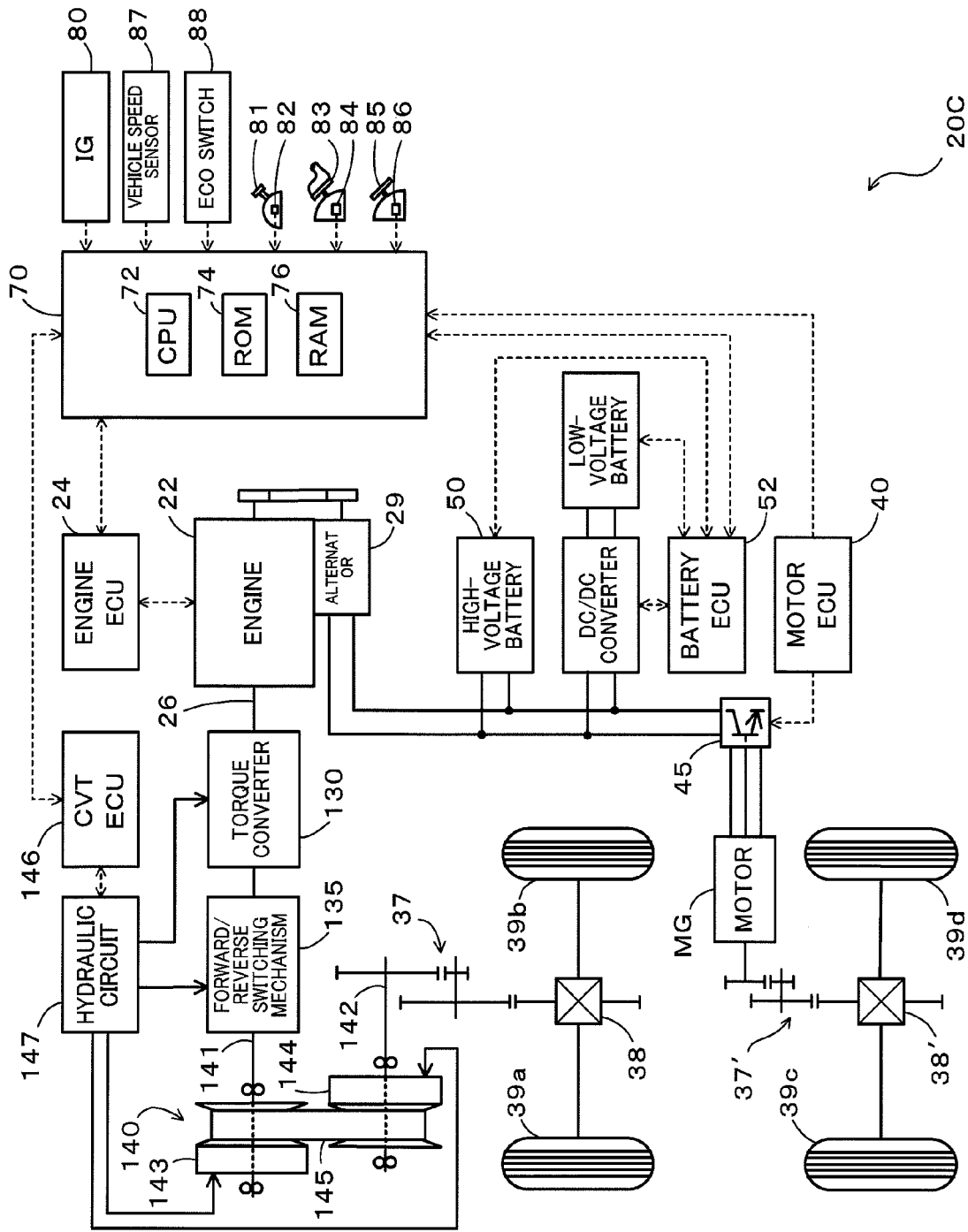
FIG. 7 is a schematic block diagram of a hybrid vehicle 20C according to a still further modification of the present invention.

The present invention may also be applied to a vehicle that includes a continuously variable transmission (hereinafter, referred to as "CVT") as a power transmitting mechanism that transmits the power from the engine 22 to the axle side instead of the power distribution and integration mechanism 30 in the hybrid vehicle 20 that has the ring gear 32 as the axle-side rotational element and the carrier 34 as the engine-side rotational element. A hybrid vehicle 20C that is one example of this kind of vehicle is illustrated in FIG. 7. The hybrid vehicle 20C as a modification example shown in FIG. 7 includes a front-wheel drive system that outputs the power from the engine 22 to, for example, wheels 39a and 39b that are front wheels via a torque converter 130, a forward/reverse switching mechanism 135, a belt-type CVT 140, a gear mechanism 37, a differential gear 38, and the like, a rear-wheel drive system that outputs power from a motor MG that is a synchronous motor generator to, for example, wheels 39c and 39d that are rear wheels via a gear mechanism 37', a differential gear 38' and the like, and a hybrid ECU 70 that controls the whole vehicle. In this case, the torque converter 130 is configured as a fluid-type torque converter that has a lock-up mechanism. Further, the forward/reverse switching mechanism 135 includes, for example, a double-pinion planetary gear mechanism, a brake and a clutch. The forward/reverse switching mechanism 135 performs switching between forward and reverse movement and connection/disconnection of the torque converter 130 and the CVT 140. The CVT 140 has a primary pulley 143 capable of changing a groove width that is connected to an input shaft 141 as an engine-side rotational element, a secondary pulley 144 that is similarly capable of changing a groove width and is connected to an output shaft 142 as an axle-side rotational element, and a belt 145 that is wound around the primary pulley 143 and the secondary pulley 144. By changing the groove width of the primary pulley 143 and the secondary pulley 144 by means of hydraulic oil from a hydraulic circuit 147 that is driven and controlled by a CVT electronic control unit 146, the CVT 140 continuously changes the speed of the power input to the input shaft 141 and outputs the resulting power to the output shaft 142. Further, a toroidal-type CVT may be applied to the hybrid vehicle 20C shown in FIG. 10 instead of the belt-type CVT 140. The motor MG is connected to an alternator 29 that is driven by the engine 22 via an inverter 45, and is connected to a battery (high-voltage battery) 50 having an output terminal connected to a power line from the alternator 29. Thus, the motor MG is driven by power from the alternator 29 or the battery 50, and performs regeneration to charge the battery 50 with electric power that is generated thereby. In the hybrid vehicle 20C constructed in this manner, the motor drive mode may be selected so as to output power equivalent to the requirement from the motor MG while stopping the operation of the engine 22. Thus, an engine stop drive control routine similar to the routine in FIG. 3 may be executed in the motor drive mode.

The correlation between the principal elements of the embodiments and modification examples, and the principal elements of the invention described in the "Disclosure of the Invention" section will now be described. That is, in the above described embodiment and modification examples, the engine 22 capable of outputting power to the ring gear shaft 32a and the like corresponds to "internal combustion engine", the motors MG and MG2 correspond to "motor", the battery 50 corresponds to "accumulator", the ECO switch 88 to select the ECO mode giving priority to fuel consumption rather than drivability corresponds to "fuel consumption priority mode selection switch", and the hybrid ECU 70 and the like executing the drive control routine shown in FIG. 3 corresponds to "engine start condition setting module", "driving force demand setting module", and "control module". Further, accelerator pedal position sensor 84 that detects the depression amount of the accelerator pedal 83 corresponds to "accelerator operation amount detecting unit", and the hybrid ECU 70 executing the acceleration work determination routine corresponds to "accelerator operation determination module". Further, the power distribution integration mechanism 30 including the ring gear 32 as the axle-side rotational element and the carrier 34 as the engine-side rotational element, the pair-rotor motor 230 including the inner rotor 232 connected to the engine 22 and an outer rotor 234 connected to the axle that outputs the power to the wheels 39a and 39b, and the CVT 140 including the input shaft 141 as the engine-side rotational element and the output shaft 142 as the axle-side rotational element correspond to "power transmitting mechanism", a combination of the motor MG1 and the power distribution integration mechanism 30, and the pair-rotor motor 230 correspond to "electric power-mechanical power input output structure", the motor MG1, the alternator 29 and the pair-rotor motor 230 correspond to "power generation motor", and the power distribution integration mechanism 30 corresponds to "three shaft-type power input output assembly". In any case, the correspondence between the main elements in the embodiment and the variant and the main elements in the invention described in "Disclosure of the Invention" do not limit the elements in the invention described in "Disclosure of the Invention" since the embodiment is an example for describing in detail the best mode for carrying out the invention described in "Disclosure of the Invention". Specifically, the embodiment is merely a detailed example of the invention described in "Disclosure of the Invention", and the invention described in "Disclosure of the Invention" should be construed on the basis of the description therein.

Hereinbefore, the embodiments of the present invention have been described with reference to drawings, however, the present invention is not limited to the above embodiments. It will be apparent that various modifications can be made to the present invention without departing from the spirit and scope of the present invention.

Industrial Applicability

The technique of the invention is preferably applied to the manufacturing industries of vehicles.

The invention claimed is:

1. A hybrid vehicle comprising:
an internal combustion engine capable of outputting power for driving the vehicle;
a motor capable of outputting power for driving the vehicle;
an accumulator capable of supplying electric power to the motor;
a fuel consumption priority mode selection switch to select a fuel consumption priority mode that gives priority to fuel consumption;
an accelerator operation amount detecting unit configured to detect an accelerator operation amount by a driver;
an accelerator operation determination module configured to determine whether or not a driver's accelerator operation is rough in accordance with the detected accelerator operation amount;
an engine start condition setting module configured to set a start condition of the internal combustion engine to a first condition when the fuel consumption priority mode selection switch is turned off during a driving without an operation of the internal combustion engine, the engine start condition setting module setting the start condition to the first condition when the accelerator operation determination module determines that the driver's accelerator operation is not rough and the fuel consumption priority mode selection switch is turned on during the driving without the operation of the internal combustion engine, the engine start condition setting module setting the start condition of the internal combustion engine to a second condition giving priority to fuel consumption in comparison with the first condition when the accelerator operation determination module determines that the driver's accelerator operation is rough and the fuel consumption priority mode selection switch is turned on during the driving without the operation of the internal combustion engine;
a driving force demand setting module configured to set a driving force demand required for driving the vehicle; and
an engine stop driving control module configured to control the internal combustion engine and the motor so that a driving power equivalent to the set driving force demand is ensured without a start of the internal combustion engine when the set start condition is not satisfied during the driving without the operation of the internal combustion engine, the engine stop driving control module controlling the internal combustion engine and the motor so that the driving power equivalent to the set driving force demand is ensured with the start of the internal combustion engine when the set start condition is satisfied during the driving without the operation of the internal combustion engine.

2. A hybrid vehicle according to claim 1, wherein the second condition has a tendency to permit the stop of the internal combustion engine to continue in comparison with the first condition.

3. A hybrid vehicle according to claim 1, wherein the first and second conditions are respectively satisfied when the set driving force demand is equal to or more than a predetermined threshold, and wherein the threshold in the second condition is larger than that in the first condition.

4. A hybrid vehicle according to claim 1, further comprising:
a power transmitting mechanism having an axle-side rotational element connected to a predetermined axle, and an engine-side rotational element connected to an engine shaft of the internal combustion engine and configured to differentially rotate with respect to the axle-side rotational element, the power transmitting mechanism capable of outputting at least a part of power from the engine shaft to the axle side.

5. A hybrid vehicle according to claim 4, wherein the power transmitting mechanism is an electric power-mechanical power input output structure connected to the predetermined axle and the engine shaft of the internal combustion engine and outputting at least a part of power from the internal combustion engine to the axle side with input/output of electric power and mechanical power, the electric power-mechanical power input output structure supplying and receiving electric power from the accumulator.

6. A hybrid vehicle according to claim 5, wherein the electric power-mechanical power input output structure includes a power generation motor capable of inputting and outputting power, and a three shaft-type power input output assembly connected with three shafts, the predetermined axle, the engine shaft of the internal combustion engine, and a rotating shaft of the power generation motor, the three shaft-type power input output assembly configured to input and output power to one remaining shaft, based on input and output of powers from and to any two shafts selected among the three shafts, and wherein the motor is capable of outputting power to the predetermined axle or another axle different from the predetermined axle.

7. A hybrid vehicle according to claim 4, wherein the power transmitting mechanism is a continuously variable transmission.

8. A control method of a hybrid vehicle including an internal combustion engine capable of outputting power for driving the vehicle, a motor capable of outputting power for driving the vehicle, an accumulator capable of supplying electric power to the motor and a fuel consumption priority mode selection switch to select a fuel consumption priority mode that gives priority to fuel consumption, an accelerator operation amount detecting unit configured to detect an accelerator operation amount by a driver, and an accelerator operation determination module configured to determine whether or not a driver's accelerator operation is rough in accordance with the detected accelerator operation amount, the method comprising the steps of:

(a) setting a start condition of the internal combustion engine to a first condition when the fuel consumption priority mode selection switch is turned off during a driving without an operation of the internal combustion engine, setting the start condition to the first condition when the accelerator operation determination module determines that the driver's accelerator operation is not rough and the fuel consumption priority mode selection switch is turned on during the driving without the operation of the internal combustion engine, and setting the start condition of the internal combustion engine to a second condition giving priority to fuel consumption in comparison with the first condition when the accelerator operation determination module determines that the driver's accelerator operation is rough and the fuel consumption priority mode selection switch is turned on during the driving without the operation of the internal combustion engine; and (b) controlling the internal combustion engine and the motor so that a driving power equivalent to a driving force demand required for driving the vehicle is ensured without a start of the internal combustion engine when the set start condition is not satisfied during the driving without the operation of the internal combustion engine, and controlling the internal combustion engine and the motor so that the driving power equivalent to the driving force demand is ensured with the start of the internal combustion engine when the set start condition is satisfied during the driving without the operation of the internal combustion engine.

9. A control method of a hybrid vehicle according to claim 8, wherein the second condition used at the step (a) has a tendency to permit the stop of the internal combustion engine to continue in comparison with the first condition.

10. A control method of a hybrid vehicle according to claim 8, wherein the first and second conditions used at the step (a) are respectively satisfied when the driving force demand is equal to or more than a predetermined threshold, and wherein the threshold in the second condition is larger than that in the first condition.

* * * * *